US008127548B2

(12) United States Patent
Anson et al.

(10) Patent No.: US 8,127,548 B2
(45) Date of Patent: Mar. 6, 2012

(54) HYBRID ELECTRICAL/MECHANICAL TURBINE ENGINE FUEL SUPPLY SYSTEM

(75) Inventors: Bruce Anson, Scottsdale, AZ (US); Jay Sims, Chandler, AZ (US); Jack Carpenter, Scottsdale, AZ (US); William Nolan, Goodyear, AZ (US)

(73) Assignee: Honeywell International Inc., Morristown, NJ (US)

( * ) Notice: Subject to any disclaimer, the term of this patent is extended or adjusted under 35 U.S.C. 154(b) by 1050 days.

(21) Appl. No.: 12/034,778

(22) Filed: Feb. 21, 2008

(65) Prior Publication Data
US 2009/0211558 A1   Aug. 27, 2009

(51) Int. Cl.
*F02C 1/00* (2006.01)
*F02C 9/00* (2006.01)
(52) U.S. Cl. .................................. 60/734; 60/39.281
(58) Field of Classification Search ............... 60/734, 60/739, 741, 776, 793, 39.281, 39.24, 790
See application file for complete search history.

(56) References Cited

U.S. PATENT DOCUMENTS

| 3,711,044 | A | * | 1/1973 | Matulich ............ 244/118.5 |
| 4,208,871 | A | * | 6/1980 | Riple, Jr. ............ 60/39.281 |
| 5,116,362 | A | * | 5/1992 | Arline et al. .................. 60/734 |
| 5,117,625 | A | * | 6/1992 | McArthur et al. ........... 60/785 |
| 5,118,258 | A |   | 6/1992 | Martin |
| 6,079,198 | A | * | 6/2000 | Prowse et al. ................. 60/776 |
| 6,484,510 | B2 |   | 11/2002 | Futa, Jr. et al. |
| 6,675,570 | B2 | * | 1/2004 | Herbison et al. ........... 60/39.281 |
| 7,114,336 | B2 |   | 10/2006 | Hommema |
| 7,216,487 | B2 |   | 5/2007 | Parsons |
| 2001/0054290 | A1 | * | 12/2001 | Herbison et al. ........... 60/734 |
| 2002/0038540 | A1 | * | 4/2002 | Griffiths et al. ........... 60/39.281 |
| 2003/0192300 | A1 | * | 10/2003 | Mahoney et al. ........... 60/39.281 |
| 2006/0053803 | A1 | * | 3/2006 | Parsons ....................... 60/773 |
| 2010/0064657 | A1 | * | 3/2010 | Mahoney et al. ........... 60/39.281 |
| 2010/0126136 | A1 | * | 5/2010 | Anson ......................... 60/39.281 |
| 2010/0293919 | A1 | * | 11/2010 | Poisson et al. .............. 60/39.281 |

FOREIGN PATENT DOCUMENTS

WO    2007044020 A2    4/2007
* cited by examiner

*Primary Examiner* — Ehud Gartenberg
*Assistant Examiner* — Gerald Sung
(74) *Attorney, Agent, or Firm* — Ingrassia Fisher & Lorenz, P.C.

(57) ABSTRACT

A turbine engine fuel supply system includes a priority flow line, a plurality of secondary fuel loads, an electric fuel metering pump, and a mechanically-driven fuel pump. The priority flow line is used to supply fuel to one or more gas turbine engine fuel manifolds. The electric fuel metering pump has a fuel inlet and a fuel outlet, and is adapted to be selectively energized and, upon being energized, to draw fuel into its fuel inlet and discharge the fuel from its fuel outlet for supply to the priority flow line. The mechanically-driven fuel pump has a fuel inlet, and a fuel outlet that is in fluid communication with the electric fuel metering pump fuel inlet and the plurality of secondary fuel loads. As such, fuel may be supplied to the secondary fuel loads independent of the electric fuel metering pump, which advantageously reduces the electrical power consumption of the electric fuel metering pump.

20 Claims, 2 Drawing Sheets

HYBRID ELECTRICAL/MECHANICAL TURBINE ENGINE FUEL SUPPLY SYSTEM

TECHNICAL FIELD

The present invention generally relates to turbine engine fuel supply systems and, more particularly, to a turbine engine fuel supply system that is configured as a hybrid of electrically-driven and mechanically-driven fuel supply systems.

BACKGROUND

Typical gas turbine engine fuel supply systems include a fuel source, such as a fuel tank, and one or more pumps. The one or more pumps draw fuel from the fuel tank and deliver pressurized fuel to one or more primary fuel loads and to one or more secondary fuel loads via one or more supply lines. Generally, the primary fuel loads, which include the fuel manifolds in the engine combustor, are supplied with fuel via, for example, a priority flow line. The secondary fuel loads, which may include a motive flow valve and regulator, one or more variable geometry actuators, and one or more bleed valves, are supplied with fuel via, for example, a secondary flow line.

Recently, there has been a desire to implement fuel supply systems with electric pumps. In such systems, fuel flow is controlled by, for example, controlling the speed of the electric pump, rather than the position of a metering valve and/or a bypass flow valve. Preferably, the electric pump is sized to supply the maximum fuel flow that may be needed by allow of the system loads. Thus, for systems that include one or more secondary fuel loads, the electric pump may need to be sized to supply a higher flow rate than what is needed by just the primary fuel loads. As a result, the overall fuel system design may exhibit certain undesirable drawbacks. For example, a relatively larger electric pump may generate excessive fuel system heat, and/or may increase overall fuel system weight and costs.

Hence, there is a need for a fuel supply system that uses an electric pump to control fuel flow to one or more primary loads and that is able to supply fuel to secondary fuel loads without generating excessive fuel system heat, and/or increasing overall fuel system weight and/or costs. The present invention addresses one or more of these needs.

BRIEF SUMMARY

In one embodiment, and by way of example only, a turbine engine fuel supply system includes a priority flow line, a plurality of secondary fuel loads, an electric fuel metering pump, and a mechanically-driven fuel pump. The priority flow line is configured to supply fuel to one or more gas turbine engine fuel manifolds. The electric fuel metering pump has a fuel inlet and a fuel outlet, and is adapted to be selectively energized and, upon being energized, to draw fuel into its fuel inlet and discharge the fuel from its fuel outlet for supply to the priority flow line. The mechanically-driven fuel pump has a fuel inlet, and a fuel outlet that is in fluid communication with the electric fuel metering pump fuel inlet and the plurality of secondary fuel loads.

In another exemplary embodiment, a gas turbine engine system includes a gas turbine engine, a plurality of secondary fuel loads, an electric fuel metering pump, and a mechanically-driven fuel pump. The gas turbine engine includes one or more fuel manifolds and a gearbox. The electric fuel metering pump has a fuel inlet and a fuel outlet, and is adapted to be selectively energized and, upon being energized, to draw fuel into its fuel inlet and supply the fuel, via its fuel outlet, to the one or more fuel manifolds. The mechanically-driven fuel pump is coupled to the gas turbine engine gearbox to be driven thereby, The mechanically-driven fuel pump has a fuel inlet, and a fuel outlet that is in fluid communication with the electric fuel metering pump fuel inlet and the plurality of secondary fuel loads.

Furthermore, other desirable features and characteristics of the present invention will become apparent from the subsequent detailed description of the invention and the appended claims, taken in conjunction with the accompanying drawings and this background of the invention.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description. In this regard, although an embodiment of the invention is described as being implemented in an aircraft and for a gas turbine engine, it will be appreciated that the invention may be implemented in numerous and varied end-use environments where fuel flow to primary and secondary fuel loads is controlled.

Figure 1:
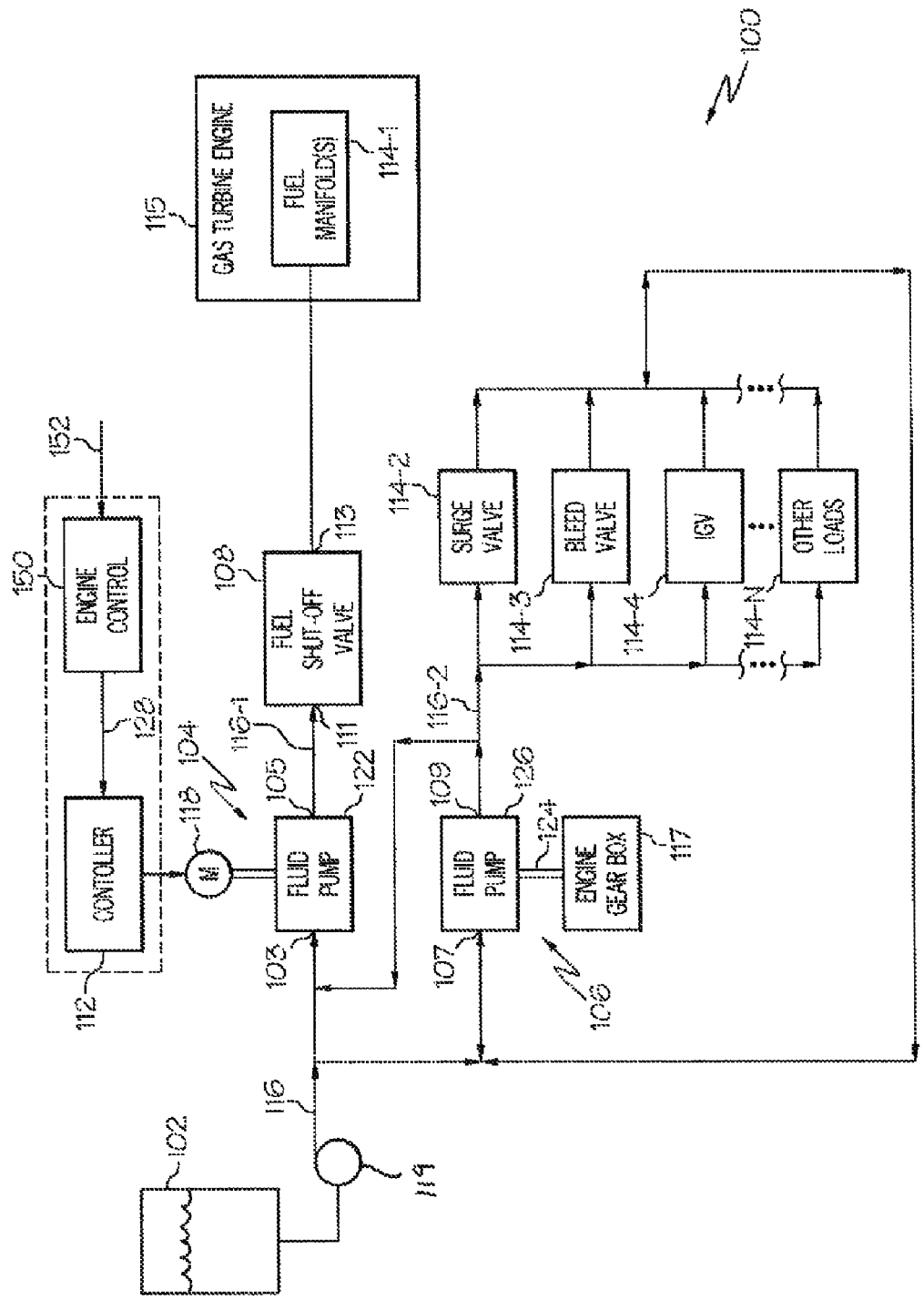
FIG. 1 is a simplified schematic diagram of an exemplary embodiment of a hybrid fuel delivery and control system for a gas turbine engine.

Turning now to FIG. 1, a simplified schematic diagram of one embodiment of a fuel delivery and control system for a gas turbine engine, such as a turbofan jet aircraft engine, is depicted. The system 100 includes a fuel source 102, an electric fuel metering pump 104, a mechanically-driven fuel pump 106, a fuel shut-off valve 108, and a motor controller 112. The fuel source 102, which is preferably implemented as one or more tanks, stores fuel that is to be supplied to a plurality of fuel loads 114 (e.g. 114-1, 114-2, 114-3, . . . 114-N). It will be appreciated that the number and type of fuel loads may vary, and may include one or more gas turbine engine fuel manifolds 114-1, one or more surge valves 114-2, one or more variable geometry actuators 114-3, and one or more bleed valves 114-4, just to name a few. The fuel loads 114 are preferably classified as primary and secondary fuel loads based, for example, on functionality. Though the classifications may vary, the one or more gas turbine engine fuel manifolds 114-1, which are disposed within the combustor zone of a gas turbine engine 115, are typically classified as primary fuel loads. Moreover, the one or more surge valves 114-2, the one or more variable geometry actuators 114-3, and the one or more bleed valves 114-4 are typically classified as secondary fuel loads. Although not depicted as such for clarity, it will be appreciated that one or more of the secondary fuel loads may additionally be disposed within the gas turbine engine 115.

A supply line 116 is coupled to the fuel source 102 and, via the pumps 104, 106, delivers the fuel to the fuel loads 114. It is noted that the supply line 116 is, for convenience, depicted and described as including a priority flow line 116-1 and a secondary flow line 116-2. The priority flow line 116-1 preferably delivers fuel to the primary fuel loads (e.g., 114-1), and the secondary flow line 116-2 preferably delivers fuel to the secondary fuel loads (e.g., 114-2, 114-3, 114-4, . . . 114-N).

The electric fuel metering pump 104 is positioned in flow-series in the supply line 116 and includes a fuel inlet 103 and a fuel outlet 105. The electric fuel metering pump 104 draws fuel into its fuel inlet 103 and supplies the fuel at a relatively high pressure, via it fuel outlet 105, to the priority flow line 116-1. The electric fuel metering pump 104 may be variously configured, but in the depicted embodiment it includes an electric motor 118 and a fluid pump 122. The electric motor 118 is configured, upon being supplied with electrical current, to generate and supply drive torque to the electric fuel metering fluid pump 122. The electric fuel metering fluid pump 122 is preferably a positive displacement pump such as, for example, a variable displacement piston pump, and includes the fuel inlet 103 and the fuel outlet 105. The electric fuel metering fluid pump 122 is configured, upon receiving the drive torque from the electric motor 122, to draw fuel into the fuel inlet 103 and discharge the fuel, at a relatively high pump discharge pressure, such as up to 1200 psig, out the fuel outlet 105 and to the priority flow line 116-1. It will be appreciated that the electric motor 118 is preferably a brushless motor, though it will be appreciated that the electric motor 118 could be implemented using any one of numerous types of AC or DC motors. It will additionally be appreciated that the electric fuel metering pump 104 could be implemented with more than one electric motor 118.

The mechanically-driven fuel pump 106 is also positioned in flow-series in the supply line 116, and includes a fuel inlet 107 and a fuel outlet 109. The mechanically-driven fuel pump 106 draws fuel into its fuel inlet 107 and discharges the fuel, also at a relatively high pressure, via its fuel outlet 107, to the electric fuel metering pump fuel inlet 103 and to the secondary flow line 116-2. The mechanically-driven pump 106 may be variously implemented, but in the depicted embodiment it includes an input shaft 124 and a fluid pump 126. The input shaft 124 is coupled to, and receives an engine drive torque from, the gas turbine engine 115. Specifically, at least in the depicted embodiment, the input shaft 115 is coupled to the gas turbine engine gearbox 117 and, upon receipt of the engine drive torque, supplies a pump drive torque to the fluid pump 126. The fluid pump 126 is preferably a high pressure pump, such as a positive displacement pump, and is coupled to the input shaft 124. The fluid pump 126 is responsive to the pump drive torque supplied from the input shaft 124 to draw fuel into its fuel inlet 107 and discharge the fuel from its fuel outlet 109 for supply to the electric fuel metering pump fuel inlet 103 and, via the secondary flow line 116-2, to the plurality of secondary fuel loads 114-2, 114-3, 114-4, . . . 114-N. It may thus be appreciated that fuel is supplied to the secondary fuel loads 114-2, 114-3, 114-4, . . . 114-N independent of the electric fuel metering pump 104.

In the depicted embodiment, the system 100 includes an additional booster pump 118, such as a relatively low horsepower centrifugal pump. The booster pump 119, if included, takes a suction directly on the fuel source 102 and provides sufficient suction head for the electric fuel metering pump 104 and the mechanically-driven pump 106. It will additionally be appreciated that the boost pump 119 may be either mechanically driven by the engine, or electrically driven by a non-illustrated motor. Moreover, the boost pump 119 may, in some embodiments, not be included. Although not depicted, it will be appreciated that the system 100 may additionally include a low pressure pump within the fuel tank(s) 102 to supply fuel to the boost pump 119.

The fuel shut-off valve 108 is positioned in flow-series in the priority flow line 116-1 downstream of the electric fuel metering pump 104. More specifically, the fuel shut-off valve 108 is mounted on the priority flow line 116-1 between the electric fuel metering pump 104 and the one or more fuel manifolds 114-1. The fuel shut-off valve 108 includes an inlet 111 that is in fluid communication with the electric fuel metering pump outlet 105, an outlet 113 that is in fluid communication with the one or more fuel manifolds 114-1, and is movable between a closed position and an open position. In the closed position, fuel flow through the fuel shut-off valve 108 and to the one or more fuel manifolds 114-1 is prohibited. Conversely, in the open position, fuel flow through the fuel shut-off valve 108 may occur. It will be appreciated that the fuel shut-off valve 108 may not be included in some embodiments. It will additionally be appreciated that the fuel shut-off valve 108, at least in some embodiments, may include additional flow ports. For example, as will be briefly described below, the fuel shut-off valve 108 may be implemented as a three-way valve.

The controller 112 is configured to control the supply of electrical current to the electric fuel metering pump 104, and more specifically to the electric motor 118, to thereby control the drive torque supplied to the fuel metering fluid pump 122. Preferably, the controller 112 is adapted to receive one or more signals 128 representative of the drive torque needed to drive the fuel metering fluid pump 122 at a speed to deliver a desired fuel flow rate to the one or more engine fuel manifolds 114-1. The motor controller 112, in response to the command signal 128, controls the current supplied to the electric motor 118 such that it generates the needed drive torque. It will be appreciated that in some embodiments, the system 100 could be implemented with more than one controller 112, most notably in system embodiments that include more than one electric motor 118.

The system 100, at least in the depicted embodiment, further includes an engine control 150. The engine control 150, which may be implemented as a Full Authority Digital Engine Controller (FADEC) or other electronic engine controller (EEC), controls the flow rate of fuel to the one or more fuel manifolds 114-1. To do so, the engine control 150 receives various input signals and controls the fuel flow rate to the one or more fuel manifolds 114-1 accordingly. In particular, the engine control 150 receives one or more signals 152 representative of a desired fuel flow to be delivered to the one or more engine fuel manifolds 114-1. The engine control 150, in response to the one or more signals 152, determines an appropriate motor speed command, and automatically generates the above-mentioned command signal 128 that is supplied to the controller 112. It will be appreciated that in some embodiments, as depicted using the dotted line in FIG. 1, the controller 112 and the engine control 150 may be integrated together.

Figure 2:
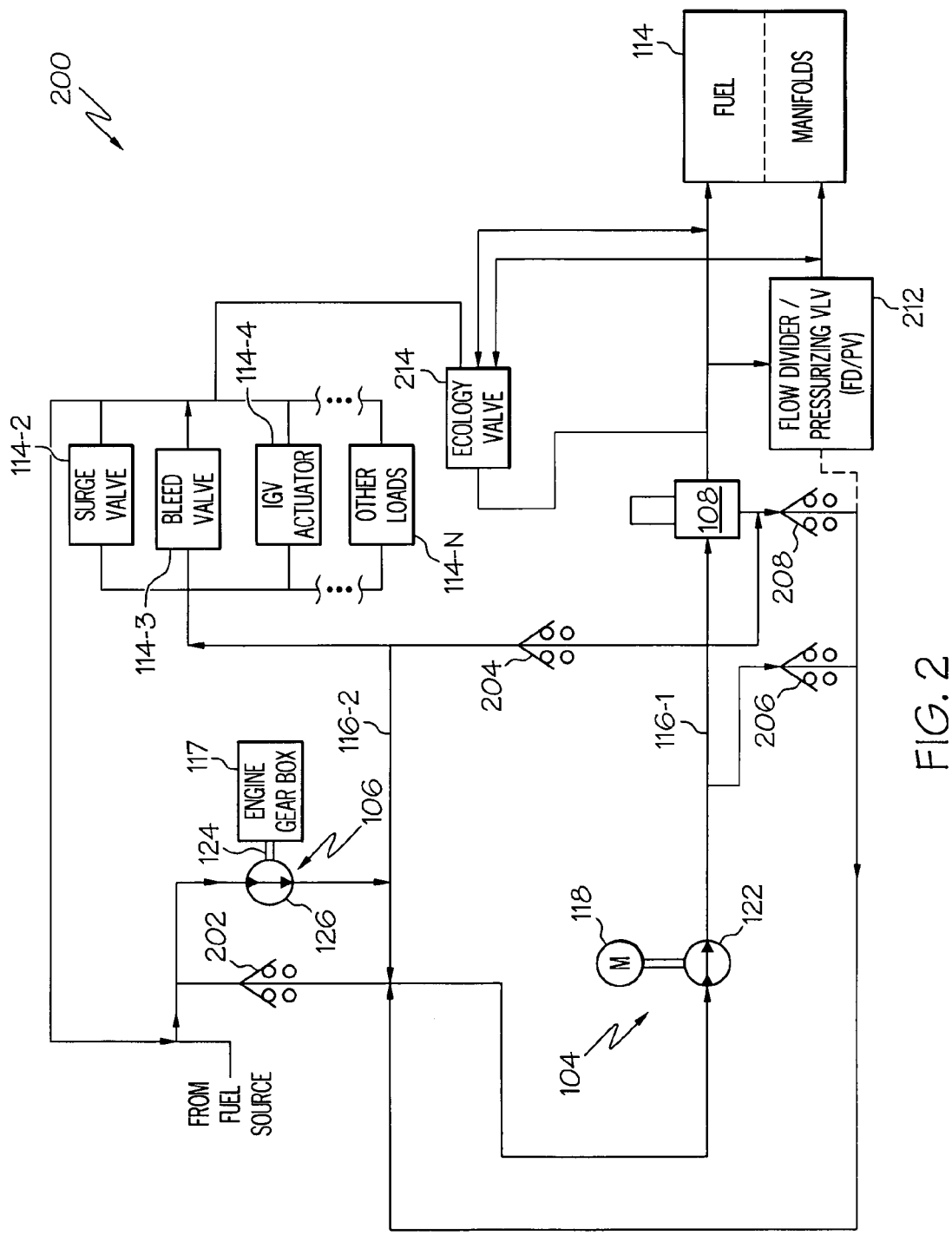
FIG. 2 is a schematic representation of an alternative embodiment of a hybrid fuel delivery and control system for a gas turbine engine.

The system 100 depicted in FIG. 1 may be implemented with additional components and associated interconnections. For example, the system 100 may be implemented with one or more check valves, one or more relief valves, a starter load valve, a flow divider valve, and an ecology valve, just to name a few. Moreover, as was alluded to above at least with respect to the fuel shut-off valve 108, the above-described components may be variously configured. At least one alternative system embodiment is depicted in FIG. 2, and the associated differences of this alternative embodiment, with respect to the system 100 of FIG. 1, will briefly be described. Before doing so, however, it is noted that like reference numerals in FIGS. 1 and 2 refer to like components, the descriptions of which will not be repeated.

Turning now to FIG. 2, it is seen that in addition to the components that are common with the system 100 of FIG. 1, this system 200 includes two check valves 202, 204, a relief valve 206, a start load valve 208, a flow divider/pressurizing valve 212, and an ecology valve 214. Moreover, the fuel shut-off valve 108 is implemented as a 3-way fuel shut-off valve. It is noted that the functions of each of the additional components included in the system 200 of FIG. 2 is readily apparent to the skilled artisan. As such, further description of each is not provided herein.

The systems 100, 200 depicted in described herein include a mechanically-driven fuel pump 106 in flow-series with an electric fuel metering pump 104 and with the plurality of secondary fuel loads 114-2, 114-3, 114-4, . . . 114-N. The electric fuel metering pump 104 is used to supply fuel only to primary fuel loads, such as one or more engine fuel manifolds 114-1. With this configuration, fuel is supplied to the secondary fuel loads 114-2, 114-3, 114-4, . . . 114-N independent of the electric fuel metering pump 104, which advantageously reduces the electrical power consumption of the electric fuel metering pump 104. Moreover, in those systems 200 that include an ecology valve 214, this configuration provides the ability to refill the one or more engine fuel manifolds 114-1 independent of engine speed during an engine start cycle.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A turbine engine fuel supply system, comprising:
   a priority flow line configured to supply fuel to one or more gas turbine engine fuel manifolds;
   a plurality of secondary fuel loads;
   an electric fuel metering pump having a fuel inlet and a fuel outlet, the electric fuel metering pump adapted to be selectively energized and, upon being energized, to draw fuel into its fuel inlet and discharge the fuel from its fuel outlet for supply to the priority flow line; and
   a mechanically-driven fuel pump having a fuel inlet and a fuel outlet, the mechanically-driven fuel pump fuel inlet in fluid communication with the electric fuel metering pump fuel inlet, the mechanically-driven fuel pump fuel outlet in fluid communication with the electric fuel metering pump fuel inlet and the plurality of secondary fuel loads,
   wherein the electric fuel metering pump may draw fuel into its fuel inlet from upstream of the mechanically-driven fuel pump fuel inlet.

2. The system of claim 1, further comprising:
   a fuel shut-off valve mounted on the priority flow line, the fuel shut-off valve having at least an inlet and an outlet, the fuel shut-off valve inlet in fluid communication with the electric fuel metering pump fluid outlet, the fuel shut-off valve movable between an open position, in which fuel discharged from the electric fuel metering pump fuel outlet flows through the fuel shut-off valve outlet, and a closed position, in which fuel discharged from the electric fuel metering pump fuel outlet does not flow through the fuel shut-off valve outlet.

3. The system of claim 1, wherein the electric fuel metering pump comprises:
   an electric motor adapted to be selectively energized and, upon being energized, to supply a drive torque; and
   a fluid pump having a fuel inlet and a fuel outlet, the fluid pump coupled to the electric motor to receive the drive torque therefrom and operable, upon receipt of the drive torque, to draw fuel into its fuel inlet and discharge the fuel from its fuel outlet for supply to the priority flow line.

4. The system of claim 1, wherein the mechanically-driven pump comprises:
   a fluid pump having a fuel inlet and a fuel outlet, the fluid pump coupled to receive a pump drive torque and operable, upon receipt of the drive torque, to draw fuel into its fuel inlet and discharge the fuel from its fuel outlet for supply to the electric fuel metering pump fuel inlet and the plurality of secondary fuel loads; and
   an input shaft adapted to be coupled to a gas turbine engine gearbox to receive an engine drive torque therefrom and supply the pump drive torque to the fluid pump.

5. The system of claim 1, wherein the secondary fuel loads comprise:
   a surge valve;
   a bleed valve; and
   a gas turbine engine inlet guide vane actuator.

6. The system of claim 1, further comprising:
   an ecology valve mounted on the priority flow line downstream of the electric fuel metering pump.

7. The system of claim 1, further comprising:
   a fuel tank adapted to have the fuel stored therein and in fluid communication with the electric fuel metering pump fuel inlet and the mechanically-driven fuel pump fuel inlet.

8. The system of claim 7, further comprising:
   a boost pump disposed between the fuel tank and the electric fuel metering pump fuel inlet and the mechanically-driven fuel pump fuel inlet.

9. The system of claim 1, further comprising:
   a controller in electrical communication with, and operable to selectively energize, the electric fuel metering pump.

10. The system of claim 9, wherein:
    the controller is adapted to receive one or more signals representative of a desired fuel flow to the one or more engine fuel manifolds; and
    the controller is configured to be responsive to the one or more signals to selectively energize the electric fuel metering pump to deliver the desired fuel flow.

11. A gas turbine engine system, comprising:
    a gas turbine engine including one or more fuel manifolds and a gearbox;
    a plurality of secondary fuel loads;
    an electric fuel metering pump having a fuel inlet and a fuel outlet, the electric fuel metering pump adapted to be selectively energized and, upon being energized, to draw fuel into its fuel inlet and supply the fuel, via its fuel outlet, to the one or more fuel manifolds; and
    a mechanically-driven fuel pump coupled to the gas turbine engine gearbox to be driven thereby, the mechanically-driven fuel pump having a fuel inlet and a fuel outlet, the mechanically-driven fuel pump fuel inlet in fluid communication with the electric fuel metering pump fuel inlet, the mechanically-driven fuel pump fuel outlet in fluid communication with the electric fuel metering pump fuel inlet and the plurality of secondary fuel loads, wherein the electric fuel metering pump may draw fuel into its fuel inlet from upstream of the mechanically-driven fuel pump fuel inlet.

12. The system of claim 11, further comprising:
a fuel shut-off valve disposed between the electric fuel metering pump and the one or more fuel manifolds, the fuel shut-off valve having at least an inlet and an outlet, the fuel shut-off valve inlet in fluid communication with the electric fuel metering pump fuel outlet, the fuel shut-off valve outlet in fluid communication with the one or more fuel manifolds, the fuel shut-off valve movable between an open position, in which fuel discharged from the electric fuel metering pump fuel outlet flows through the fuel shut-off valve outlet, and a closed position, in which fuel discharged from the electric fuel metering pump fuel outlet does not flow through the fuel shut-off valve outlet.

13. The system of claim 11, wherein the electric fuel metering pump comprises:
an electric motor adapted to be selectively energized and, upon being energized, to supply a drive torque; and
a fluid pump having a fuel inlet and a fuel outlet, the fluid pump coupled to the electric motor to receive the drive torque therefrom and operable, upon receipt of the drive torque, to draw fuel into its fuel inlet and discharge the fuel from its fuel outlet for supply to the one or more fuel manifolds.

14. The system of claim 11, further comprising:
a priority flow line fluidly communicating the electric fuel metering pump outlet and the one or more fuel manifolds; and
an ecology valve mounted on the priority flow line downstream of the electric fuel metering pump.

15. The system of claim 11, wherein the mechanically-driven pump comprises:
a fluid pump having a fuel inlet and a fuel outlet, the fluid pump coupled to receive a pump drive torque and operable, upon receipt of the drive torque, to draw fuel into its fuel inlet and discharge the fuel from its fuel outlet for supply the electric fuel metering pump fuel inlet and the plurality of secondary fuel loads; and
an input shaft adapted to be coupled to a gas turbine engine gearbox to receive an engine drive torque therefrom and supply the pump drive torque to the fluid pump.

16. The system of claim 11, wherein the secondary fuel loads comprise:
a surge valve;
a bleed valve; and
a gas turbine engine inlet guide vane actuator.

17. The system of claim 11, further comprising:
a fuel tank adapted to have the fuel stored therein and in fluid communication with the electric fuel metering pump fuel inlet and the mechanically-driven fuel pump fuel inlet.

18. The system of claim 17, further comprising:
a boost pump disposed between the fuel tank and the electric fuel metering pump fuel inlet and the mechanically-driven fuel pump fuel inlet.

19. The system of claim 11, further comprising:
a controller in electrical communication with the electric fuel metering pump and adapted to receive one or more signals representative of a desired fuel flow to the one or more engine manifolds, the controller responsive to the one or more signals to selectively energize the electric fuel metering pump to deliver the desired fuel flow.

20. A turbine engine fuel supply system, comprising:
a priority flow line configured to supply fuel to one or more gas turbine engine fuel manifolds;
a plurality of secondary fuel loads;
an electric fuel metering pump having a fuel inlet and a fuel outlet, the electric fuel metering pump adapted to be selectively energized and, upon being energized, to draw fuel into its fuel inlet and discharge the fuel from its fuel outlet for supply to the priority flow line;
a mechanically-driven fuel pump having a fuel inlet and a fuel outlet, the mechanically-driven fuel pump fuel inlet in fluid communication with the electric fuel metering pump fuel inlet, the mechanically-driven fuel pump fuel outlet in fluid communication with the electric fuel metering pump fuel inlet and the plurality of secondary fuel loads; and
an ecology valve mounted on the priority flow line downstream of the electric fuel metering pump.
wherein the electric fuel metering pump may draw fuel into its fuel inlet from upstream of the mechanically-driven fuel pump fuel inlet.

* * * * *